Nov. 30, 1965  J. T. ESCHBAUGH  3,220,694
PLUG VALVE HAVING AN IMPROVED SEAT
Filed Dec. 20, 1963
FIG. 1
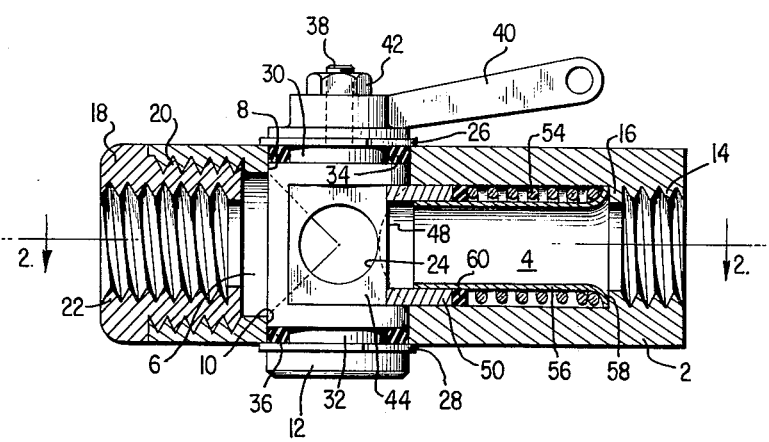
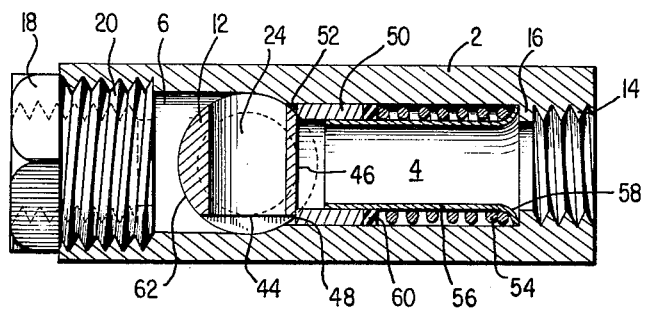
FIG. 2
INVENTOR.
JOHN T. ESCHBAUGH
BY
*Burns, Doane, Benedict, Swecker, & Mathis*
ATTORNEYS.

United States Patent Office 3,220,694
Patented Nov. 30, 1965

1

3,220,694
PLUG VALVE HAVING AN IMPROVED SEAT
John T. Eschbaugh, 321 N. Plum St., Havana, Ill.
Filed Dec. 20, 1963, Ser. No. 332,028
3 Claims. (Cl. 251—174)

This invention relates to a valve, and more particularly, to a plug valve having a novel seat and plug arrangement.

Although plug valves are well known, there are a number of limitations and disadvantages present in the valves currently being used by the industry. The rubbing of the plug against the seat during rotation of the plug causes an attrition of the originally smooth seating surface. This results in extreme wear and leakage. To prevent leakage between the plug and the seat, and to obtain bubble tight seating, resilient surfaces or inserts have been added to the seat member. However, the temperature and abrasion resistance of such inserts is severely limited.

An additional disadvantage of plug valves, especially the heavy duty types utilizing tapered plugs, is their high cost due to the intricate machining processes necessary for their manufacture. Moreover, such valves require extremely close tolerance between a large number of parts, greatly increasing the possibility of leakage.

Additionally, the maintenance of most plug valves is a time consuming and expensive proposition. For a major overhaul of the valve, it is necessary to remove the entire valve from the line before the components can be serviced. In many valves, it is necessary to replace a large number of parts before the valve can be reused.

It is a general object of the present invention to overcome the above noted disadvantages and to provide a valve which provides a tight seal between the plug and seat.

Another object of this invention is to provide a plug valve having a tight seal between a metal plug and a metal seat, yet has an extremely low turning torque.

Still another object of this invention is to provide a plug valve which can be manufactured with a minimum of intricate machining processes and which has a minimum of surfaces needing critically machined dimensions.

Yet another object of this invention is to provide a valve which is extremely easy to overhaul without necessitating removal of the valve from the line.

A more specific object of this invention is to provide a plug valve having a plug which is snapped into its proper position and which wipes the seating surface during its rotation.

In order to accomplish the foregoing objective there is provided a plug valve including body means, rotary plug means, and seat means. The seat means is resiliently urged toward and into engagement with the outer periphery of the rotary plug means. Diverse surface means are formed upon the rotary plug means.

Seat displacing means, interposed between adjacent surface means of the rotary plug means, causes the seat means to move away from the plug means when the plug means is rotated.

In the preferred embodiment each surface means comprises a flat surface extending parallel to the axis of rotation of the plug.

A more complete understanding of these and other features of the invention will be gained from a consideration of the following description and from the accompanying drawings in which:

FIGURE 1 is a vertical cross-sectional view; and
FIGURE 2 is a horizontal cross-sectional view taken along the line 2—2 of FIGURE 1.

Referring in more detail to the drawings, the valve comprises a body 2 provided with an inlet port 4 and an outlet port 6. Cylindrical openings 8 and 10 are formed in the top and bottom portions of the body 2 for the reception of a rotary mounted metallic plug member 12. The inlet port 4 is provided with internal threads 14 for convenient attachment to an external line. A radially inwardly extending flange portion 16 is provided internally of the threads 14 for a purpose to be later described. Because of the flange 16, it is convenient to machine the bore of the inlet port from the outlet port side. In such a case, an adapter 18 having a bore therethrough is positioned in the outlet port. External threads 20 are provided which mate with internal threads in the outlet port to secure the adapter. The bore of adapter 18 has threads 22 to provide means for attachment of the valve to an external line.

The plug member is provided with a passageway 24 having an axis perpendicular to the axis of the plug. Upon rotation of the plug 12, the ends of the bore 14 will align the inlet and outlet ports to provide communication therebetween. The plug 12 is retained in proper position within the body by means of snap rings 26 and 28 mounted in grooves 30 and 32 respectively near the top and bottom of the plug. The snap rings are in contact with the top and bottom of the body 2 to prohibit withdrawal of the plug. An O-ring 34, of Teflon or other suitable material, is mounted in groove 30 immediately below the snap ring 26 and is in contact with the walls of the opening 8 in body 2 to provide a bearing surface and a sealing means. Similarly, an O-ring 36 is mounted immediately above snap ring 28 in groove 32 and contacts the walls of the opening 10.

The top of the plug is provided with a cylindrical projection 38 of smaller diameter than the main portion of the plug. A handle or control lever 40 is mounted on projection 38 to rotate the plug. This handle is held in place by a retaining nut 42.

The main portion of the plug, in the region defined by the top and bottom internal surfaces of the inlet port 4, has flat surface means 44 and 46. It can be seen that each of these surfaces extends parallel to the axis of the plug 12. Surface 44 is perpendicular to the axis of the passageway 24 and surface 46 is parallel to the axis of the passageway 24. The two surfaces are substantially at right angles to each other and join to define an edge portion 48.

A tubular metallic seat member 50 is slidably mounted within the inlet port 4 and is provided with a flat end surface 52. The seat member 50 is biased by a coil spring 54 against the plug 12 with the end surface 52 of the seat member 50 contacting one of the flat surfaces 44 or 46 of the plug to provide an effective seal. The seat member will contact flat surface 44 of the plug when the valve is open and will contact flat surface 46 when the valve is closed. The seat member may be provided with a resilient gasket such as a rubber or Teflon O-ring.

An annular liner 56 is positioned within the coil spring 54 and the seat member 50 to protect the sliding mechanism from slurry and other contaminants. The liner 56 has a flared portion 58 at one end which abuts the flange 16 in the inlet port 4. The spring 54 in turn abuts against the flared portion 58 of the annular liner 56 and forces the seat member 50 against the plug. To prevent leakage between the sleeve 56 and seat member 50, an O-ring 60, preferably made from Teflon, is interposed btween the end of the coil spring 54 and the seating member 50. In some instances, the entire seat assembly including the seat member 50, the coil spring 54, the O-ring 60, and the liner 56 may be replaced by a bellows having a replaceable seat.

Upon initiating the rotation of the plug 12 from one position to another, the edge 48 pushes the seat away from the flat surface. As the rotation is continued, edge 48 wipes across the flat end surface 52 of the seat member 50. This action tends to remove any foreign matter which has accumulated on the end surface 52 which would prevent an effective seal between the plug 12 and the seat member 56 and also minimizes dishing of the seat surface. During rotation, as the edge 48 passes the axis of the seat member 50, the force of the seat against the edge will snap the plug into its final position with the flat end of the seat member contacting one of the flat surfaces of the plug.

It can be seen that only edge 48 rubs against the seat member 50 during rotation. As a result there will be little or no wear on the flat surfaces 44 and 46. Wear upon the seat member 50 is minimized since there is limited contact between the edge or seat displacing means 48 of the plug 12 and the end surface 52 of the seat member when there is relative movement between the plug and seat member.

Should it become necessary to overhaul the valve, the important components can be replaced without removing the valve from the line. The plug 12 can be withdrawn by rotating it until the cylindrical surface 62 is adjacent the seat member 50. This will push the seat member 50 toward the inlet side of the valve. Since no other surface of the plug projects a greater distance from the axis of the plug, the seat member will not overlap the plug. After the snap ring 28 has been removed, the plug 12 may be easily withdrawn from the openings 8 and 10 in the body of the valve. The seat member 50 and the O-ring 60 can then be withdrawn through one of the openings and new ones inserted. After the plug has been withdrawn, it is a relatively simple matter to replace the O-rings 34 and 36. The plug can then be positioned in the openings 8 and 10 after the seat has been forced back with a conventional handtool, and the snap rings attached.

It will be apparent that in the described modification having two flat faces, stop means may be provided on the handle and body of the valve to prohibit the operator from rotating the plug clockwise from its position shown in FIGURE 2, or counterclockwise from its position after flat surface 44 is snapped into engagement with seat 50.

However, it is to be understood that the invention is not to be limited to merely two flat surfaces. It would be obvious that additional surfaces may be utilized. For example, four surfaces arranged to form a square in cross-section, could be provided, in which case it would not be necessary to provide stop means on the valve body and handle. The plug could then be rotated in one direction any number of turns since a flat surface will always be snapped into contact with the seat member after a quarter turn. In such a modification, 90° reversal of the plug is not necessary, and a relatively simple actuator may be used. It should also be noted that a second seat member and biasing means, similar to the one described above, may be provided in the outlet port if desired.

It can readily be seen that the plug member itself can be machined on standard automatic equipment from conventional bar stock, either round or polygonal in cross section. This results in a more rugged and less expensive valve.

Although the many advantages and features of the present invention have been mentioned before in detail, in summary some of them include, the minimizing of wear of the important components, the wiping of the seat surface during rotation of the plug, the snapping of the plug into position, and the ease of maintenance without removing the valve from the line.

Various other modifications and alterations will suggest themselves readily to persons skilled in the art. It is intended therefore that the foregoing be considered as exemplary only, and that the scope of the invention be ascertained from the following claims.

I claim:

1. A valve comprising a body member having inlet and outlet ports, a plug rotatably mounted in said body member and having a passageway therethrough, the end of said passageway adapted to align with said inlet and outlet ports upon rotation of said plug, a flat surface on said plug parallel to the axis of said plug and extending transversely of said passageway, a second flat surface on said plug parallel to the axis of said plug, and extending transversely of said first surface and joining said first surface at an edge portion, cylindrical shoulder portions on said plug positioned adjacent the axial extremities of said flat surfaces, a cylindrical surface on said plug spaced from said axis a distance at least as great as any other point on said plug, seat means mounted within said inlet port, and biasing means for urging said seat against said plug between said shoulder portions, said seat means contacting said first flat surface when said valve is closed and contacting said second surface when said valve is open, and said cylindrical surface adapted to contact said seat member permitting withdrawal of said plug.

2. A valve comprising a body member provided with inlet and outlet ports and having an opening therethrough, a plug rotatably mounted in said opening and extending therethrough, a passageway through said plug, the ends of said passageway adapted to align with said inlet and outlet ports upon rotation of said plug, a groove in said plug adjacent each of the ends of the opening in said body, an O-ring mounted in each of said grooves and in contact with the walls of said opening, snap rings mounted in each of said grooves to retain said plug within said body member, a flat surface on said plug parallel to the axis of said plug and extending transversely of said passageway, a second flat surface on said plug parallel to the axis of said plug and joining said first surface at an edge portion, cylindrical shoulder portions on said plug positioned adjacent the axial extremities of said flat surfaces, seat means mounted within said inlet port, and biasing means urging said seat means into engagement with said plug between said shoulder positions, said seat means contacting said first flat surface when said valve is open and contacting said second flat surface when said valve is closed, and said seat means being adapted to be withdrawn through said opening when said plug is removed.

3. A valve comprising a body member having aligned inlet and outlet ports and provided with an opening therethrough, a cylindrical plug rotatably mounted in said opening and having a passageway therethrough, the ends of said passageway adapted to align with said inlet and outlet ports upon rotation of said valve, a groove in said plug adjacent the ends of said opening in said body, an O-ring mounted in each of said grooves and in contact with the walls of said opening, split retainer rings mounted on said plug for holding said plug in said opening, a first flat surface on said plug extending parallel to the axis of said plug and transversely of said passageway, a second flat surface on said plug extending parallel to the axis of said plug and perpendicular to said first surface, a tubular seat member positioned within said inlet port, spring means biasing said seat member against said plug member, an O-ring interposed between said spring member and said seat member, a tubular liner within said O- ring and said spring member, said seat member contacting said first flat surface when said valve is in its open position and contacting said second flat surface when said valve is in its closed position.

References Cited by the Examiner

UNITED STATES PATENTS

| 24,102 | 12/1855 | Ohls | 251—172 |
|---|---|---|---|
| 1,062,064 | 5/1913 | Ward | 251—174 |
| 2,030,458 | 2/1936 | McKellar | 251—174 X |
| 2,433,732 | 12/1946 | Brown | 251—309 X |
| 2,466,098 | 4/1949 | Grebmeier | 251—174 |
| 2,548,128 | 4/1951 | Snyder | 251—314 |
| 2,767,729 | 10/1956 | Mueller | 251—183 X |
| 2,772,848 | 12/1956 | Holzer | 251—174 X |
| 2,834,613 | 5/1958 | Snyder | 251—174 X |
| 2,866,213 | 12/1958 | McArthur | 251—174 X |
| 2,892,610 | 6/1959 | Graham | 251—192 X |
| 2,973,182 | 2/1961 | Gill | 251—174 |

ISADOR WEIL, *Primary Examiner.*

M. CARY NELSON, *Examiner.*